Patented July 16, 1946

2,403,960

UNITED STATES PATENT OFFICE 2,403,960

ANTISTATIC TREATMENT OF VINYL RESIN ARTICLES

William N. Stoops, South Charleston, W. Va., and Alexander L. Wilson, Sharpsburg, Pa., assignors to Carbide and Carbon Chemicals Corporation, a corporation of New York No Drawing. Application April 10, 1943, Serial No. 482,622

12 Claims. (Cl. 117—139.5)

This invention relates to the treatment of filaments, fibers, yarns, films, woven, knitted and felted fabrics and other articles made from or containing vinyl resins for the purpose of eliminating the tendency of such articles to accumulate charges of static electricity either during the production thereof; during the subsequent treatment of such articles in connection with various finishing operations; or in the course of the use of these articles. It has especial utility in the treatment of those of the aforesaid articles made from water-insoluble vinyl resins such as those formed by the polymerization of at least one vinyl compound, including a vinyl halide, for rendering the finished fabric more suitable for the manufacture of wearing apparel and industrial fabrics, and for a wide variety of other purposes.

Rapid advances have been made during recent years in the development of vinyl resins eminently suitable for use in the production of synthetic filaments, fibers, yarns and fabrics possessing the important properties of high true elasticity, flexibility and high tensile strength, in conjunction with high dielectric strengths, controlled shrinkage, and high resistance to water, alkalies and mineral and organic acids, rendering them of outstanding merit in the production of textiles for a wide variety of uses. Certain vinyl resins having such characteristics are described in the United States Patent No. 2,161,766 of E. W. Rugeley, T. A. Feild, Jr., and J. F. Conlon. As therein described, such resins may be produced by the conjoint polymerization of a vinyl halide such as a vinyl chloride with a vinyl ester of an aliphatic acid such as vinyl acetate. They generally contain between about 50% and about 95% by weight of the halide in the polymer, and have average macromolecular weights of at least 7500, and preferably of 15,000 or more.

Other halide-containing vinyl resins suitable for use in making such articles include those formed by the conjoint polymerization of a vinyl halide such as vinyl chloride with N-alkylated imide derivatives of aliphatic acids, for example N-butyl maleimide; vinyl resins formed by the chlorination of polyvinyl chlorides; resins formed by the chlorination of products of the conjoint polymerization of a vinyl halide with a vinyl ester of an aliphatic acid; resins formed by the conjoint polymerization of a vinyl halide, a vinyl ester of an aliphatic acid, and maleic acid; and resins formed by the conjoint polymerization of a vinyl halide, such as vinyl chloride, with nitriles of unsaturated organic acids, such as acrylonitrile.

Those vinyl resins which contain a substantial percentage of a polyvinyl halide in the molecule are particularly subject to the disadvantage that fibers, yarns or other articles made therefrom, tend to develop an electrostatic charge upon their surfaces when they are subjected to friction during production, and later during processing of the fibers, and especially during the service life of the finished article.

Heretofore many unsuccessful attempts have been made to devise a treatment of such a vinyl resin composition, or article made therefrom, which will prevent or reduce the accumulation of an electrostatic charge on the surface of articles made therefrom. It is very important that any treatment or additive employed shall provide continued protection against the development of such a static charge, and, at the same time, shall not substantially reduce the tensile strength, flexibility, elasticity, resistance to chemical, bacterial and fungal agencies, and other important properties of the vinyl resin so as to render the article unsuitable for the intended purpose. The anti-static protection thereby provided for the surface of the article preferably should be maintained during the normal life of the article, and after repeated washings thereof with the usual detergents, such as soap and water.

The present invention is based in important part upon the discovery that the accumulation of static electricity upon the surfaces of filaments, fibers, yarns and various fabrics and other articles made of or containing vinyl resins, may be prevented or retarded by treating such articles, preferably after the usual scouring and rinsing operations, with one or more highly basic, water-dispersible polyalkylene polyamines having average macromolecular weights of at least 300—and particularly the polyethyleneimines—and derivatives of such polyamines containing, attached to one or more nitrogen atoms, at least one group selected from the class consisting of the alkyl groups, the hydroxyalkyl groups, the aminoalkyl groups, and the higher fatty acyl and acimido groups having ten or more carbon atoms therein.

Those polymers of ethyleneimine, that have average macromolecular weights between around 300 and around 3000, and compounds made up of or containing such ethyleneimino units, are particularly effective; while those within this range having average molecular weights above about 800 generally are preferred.

The molecular weights of the polymers were determined by the ebullioscopic method, by measuring the boiling point elevation of known amounts of such polymers in solution in methyl alcohol, generally in amounts forming a 3% to 6% solution of the polymer.

The amount of the polyethylene polyamine or derivative thereof, found most suitable for the majority of applications, ranges between 0.5% and 4% of the dry weight of the article being treated; and an amount thereof approximating 1% of the dry weight of the article generally is preferred.

The polyethylene polyamine compounds of high molecular weight preferably are applied to the article in the form of an aqueous solution or dispersion, and in the presence of a suitable wetting agent for the vinyl resin article being treated. The wetting agent may conveniently be used in amounts ranging between 1% and 10% of the dry weight of the article.

In general, when treating filaments, fibers, yarns, fabrics and other articles made from or containing vinyl resins produced by the conjoint polymerization of a vinyl halide with a vinyl ester of an aliphatic acid; or similar articles composed of or containing vinyl chloride-N-alkyl maleimide copolymers; or vinyl halide-vinyl ester of an aliphatic acid-maleic acid copolymers; or vinyl chloride-acrylonitrile copolymers; the temperature of the aqueous or other treating solution containing the polyethyleneimine or derivatives should be maintained within the range between around 25° C. and around 65° C., and preferably, within the range from around 60° C. to 65° C. On the other hand, when treating these and other vinyl resin polymers which have been subjected to an after-chlorination following their production, the temperature of the treating bath conveniently may be maintained at temperatures as high as around 75° C., depending upon the softening point of the resin.

Following the anti-static treatment, the static-resistant article may be rinsed in water, which preferably is warm, and may then be dried in the usual manner, and given other finishing treatments; or it may be dyed and scoured before drying.

The polyethylene polyamines and derivatives thereof useful in the process include both those having closed-chain and those having open-chain structures, and containing at least five basic nitrogen atoms, and preferably at least twenty basic nitrogen atoms, in the average molecule. The presence in the molecule, preferably at one or more nitrogen atoms, of one or more fatty acid residues, and/or one or more other substituents such as alkyl, hydroxyalkyl, aminoalkyl, acyl and acimido groups containing not more than five carbon atoms, may render the compounds useful or producing certain special characteristics in the finished textiles. Among such fatty acid residues may be mentioned those corresponding to oleic acid, stearic acid, lauric acid, and the other well-known higher fatty acid radicals having around ten to twenty carbon atoms. Hydroxyethyl and hydroxypropyl groups may be introduced into the polyamines by suitable treatment of the latter with ethylene oxide and propylene oxide in well-known manner.

The following examples are representative of procedures for producing polyethylene polyamines useful in the practice of the invention. All parts are given therein in terms of weight:

(a) After allowing a mixture of 100 parts of ethyleneimine and 3 parts of concentrated hydrochloric acid to stand at room temperature for 29 days, it was heated to 100° C. under an absolute pressure of 3 mm. of mercury, to remove volatile material. The residual polyethyleneimine was a viscous pleasant-odored mass having an average molecular weight of 1420.

(b) A mixture of 100 parts of ethyleneimine and 300 parts of water was refluxed for eighteen hours. The product was stripped free of water, and evaporated at 120° C. under an absolute pressure of 5 mm. of mercury. The residual imine polymer had an average molecular weight of 900.

(c) 10 parts of ethylene diamine, 100 parts of ethyleneimine and 323 parts of water were refluxed for eighteen hours. After removing materials volatilizable below 215° C. under an absolute pressure of 2 mm. of mercury, a moderately viscous, colorless and odorless liquid polyethylene polyamine was obtained, having an average molecular weight of 500.

(d) A mixture of 60 parts of polyethyleneimine having an average molecular weight of 900, 19 parts of oleic acid, and about 88 parts of xylene, was refluxed, water being removed continuously. After six hours the temperature of this mixture had reached 180° C. The product was then stripped of volatile materials at a temperature of 200° C., under an absolute pressure of 25 mm. of mercury, yielding as residue a polyethyleneimine derivative in the form of a viscous amber liquid of high molecular weight.

(e) 100 grams of ethyleneimine was mixed with 300 grams of water and refluxed for eighteen hours. The product was stripped free of water and finally evaporated at 200° C. under an absolute pressure of 5 mm. of mercury, thereby yielding a polyethyleneimine having an average molecular weight of approximately 1600.

(f) 100 grams of ethyleneimine were refluxed with 300 grams of water for 40 hours. The product was stripped free of water and evaporated at a temperature of 120° C. under an absolute pressure of 5 mm. of mercury. A quantity of the residual polyethyleneimine having a molecular weight of approximately 1140, was heated on a water bath while being treated with ethylene oxide, of which 4.8 grams were absorbed by 49 grams of the residue over a period of 1.75 hours, corresponding to an absorption of one mol of the ethylene oxide for each ten mols of the initial ethyleneimine.

Successive batches of knitted hosiery made from the vinyl resin described in Example I were agitated for forty-five minutes in aqueous solutions containing, respectively, 0.2% by weight of a corresponding one of the amines mentioned in the preceding paragraphs designated (a) to (f) and containing 0.5% by weight of the sodium salt of a sulphate ester of a secondary heptadecanol, which solutions were maintained at 65° C. An aqueous solution to dry resin ratio of 20 to 1 by weight was employed. The treated hosiery were then rinsed in water, and were dried for twenty minutes at 62° C., on hosiery forms. The resultant products were static-resistant, and retained this property following a series of washings with soap and water.

Wetting agents effectively employed in the treating baths of the invention include the alkali metal salts and the basic organic salts of sulfate esters of primary and secondary aliphatic alcohols, particularly those having between eight and twenty carbon atoms in the molecule, such as the sodium and the various ethanolamine salts of lauryl sulfate, and similar salts of sulfate esters of tetradecyl and heptadecyl primary and secondary aliphatic saturated alcohols. Water-soluble salts of alkylated aromatic sulfonic acids likewise are very suitable. Among suitable wetting agents may be mentioned triethanolamine tetradecyl sulfate, sodium hexadecyl sulfate, sodium lauryl sulfate and lauryl alcohol, sodium oleyl sulfate, and sodium dihexyl sulfosuccinate. The usual soaps or salts of fatty acids are objectionable because of the formation of gummy or other precipitates upon the article in the presence of the polyethyleneimines.

The following examples will serve to illustrate the invention for the anti-static treatment of hosiery:

Example I

Dyed hosiery, knitted from vinyl resin yarns formed in the manner described in the aforesaid United States Patent No. 2,161,766 from a vinyl resin produced by the conjoint polymerization of vinyl chloride and vinyl acetate—which resin contained around 90% of the chloride in the polymer, and had a macromolecular weight of at least 15,000—were agitated for 45 minutes in an aqueous solution maintained at between 60°–65° C., and containing 0.2% of a polyethyleneimine having an average molecular weight of 900, together with 0.5% of a sodium salt of the sulfate ester of 3, 9 diethyltridecanol-6 as wetting agent. The ratio of this solution to the dry hosiery was about 20 to 1 by weight. This ratio may be varied considerably, especially where the amounts of the polyethyleneimine and the wetting agent are maintained at around 4% and 10%, respectively, of the dry weight of the hosiery. After the treatment, the hosiery were washed in warm water and dried. The resultant hosiery did not possess a tendency to accumulate a charge of static electricity even after ten washings with soap and water.

Example II

Dyed hosiery of the type described in Example I were immersed for a few minutes at room temperature in an aqueous solution containing 2% of the polyethyleneimine mentioned in that example. The treated hosiery were then dried on forms at 60–65° C. for around forty-five minutes. This method of treatment fixes the polyamine in the hosiery as they are dried and provides good anti-static protection for the hosiery. It is less desirable than the method described in Example I, since it increases the number of forms and drying ovens required.

Example III

Dyed hosiery, knitted from a vinyl resin formed by the conjoint polymerization of vinyl chloride and acrylonitrile, said resin having a chloride content of about 60% and a specific viscosity of 0.3 at 20° C., determined according to the formula $$\text{Sp. vis.} = \frac{\text{Viscosity of a solution of 0.1 gram of the resin in 50 c. c. of acetonyl acetone}}{\text{Viscosity of the acetonyl acetone}} - 1$$

were agitated for 30 minutes in an aqueous solution maintained at 50° C. and containing 1.5% (based on the weight of the dry hosiery) of polyethyleneimine polystearamide having an average molecular weight of approximately 1400. The ratio of the said solution to the dry hosiery was 30 to 1 (by weight). After this treatment, the hosiery were washed in water and dried at 100° C. for 10 minutes. The resultant hosiery were satisfactorily resistant to the development of charges of static electricity for over ten washings with soap and water. The polyethyleneimine polystearamide used in this example was prepared by mixing 43 grams of ethyleneimine polymer, having an average molecular weight of approximately 900, with 28.4 grams of stearic acid, and sufficient xylene to give the liquid a boiling point of 200° C. The liquid was refluxed over a period of four hours at 200° C., water being removed as azeotropic mixture with xylene to the amount of 2.6 grams. The xylene then was stripped off under vacuum. The product on cooling to 60° C. may be mixed with an equal weight of water to promote ready dispersion in further water.

Yarns, batts, felts, fabrics, and other articles made from fibers of a vinyl resin admixed with fibers of another textile material such as silk, wool, cellulose derivatives such as cellulose acetate, and polyamides, also may be effectively treated by the process, with a corresponding reduction or elimination of the tendency of such articles to hold a surface charge of static electricity.

It is within the scope of the invention to substitute for part or all of the water in the treating solutions, volatile solvents for the polyalkylene polyamine or derivative thereof which are inert to the latter, and are non-solvents for the vinyl resin but may wet the resin.

While the present anti-static treatment may be applied to the articles after the dyeing operation, it is preferred to treat the undyed article.

The anti-static compounds of the invention may be described in general as highly basic, water dispersible, polyalkylene polyamines, or derivatives thereof formed by introducing at one or more nitrogen atoms at least one acyl, acimido, aminoalkyl, hydroxyalkyl or alkyl group, or one or more fatty acid residues. Such compounds have a high content of aliphatic amine groups; they have low vapor pressures at the temperatures of application, i. e., from around room temperature to 75° C.; and they possess high average molecular weights of at least 300, to minimize penetration of the article by the treating agent, and to restrict the reaction to the surface thereof.

The invention is susceptible of modification within the scope of the appended claims.

We claim:

1. The process for reducing the tendency of filaments, fibers, yarns, fabrics and other articles comprising a resinous polymerization product of at least one vinyl compound including a vinyl halide to accumulate charges of static electricity, which comprises applying to the surface of such an article a liquid composition containing, as an essential anti-static component, at least one water-dispersible compound having a polyalkylene polyamine nucleus, said nucleus having an average molecular weight of at least 300.

2. The process for reducing the tendency of filaments, fibers, yarns, fabrics and other articles comprising a water-insoluble vinyl resin formed by the polymerization of at least one vinyl compound including a vinyl halide to accumulate charges of static electricity, which comprises applying to such an article a liquid composition containing, as an essential anti-static component, at least one water-dispersible compound having a polyethylene polyamine nucleus, said nucleus having an average molecular weight of at least 300.

3. The process for reducing the tendency of filaments, fibers, yarns, fabrics and other articles comprising a water-insoluble vinyl resin formed by the polymerization of at least one vinyl compound including a vinyl halide to accumulate charges of static electricity, which comprises applying to such an article a liquid composition, as an essential anti-static component, at least one water-dispersible compound having a polyethylene polyamine nucleus, said nucleus having an average molecular weight of at least 300, in the presence of a wetting agent for said vinyl resin.

4. The process of reducing the tendency of yarns, filaments, fibers, woven, knitted and felted fabrics and other articles composed of or containing a water-insoluble vinyl resin formed by the polymerization of at least one vinyl compound including a vinyl halide to accumulate charges of static electricity, which comprises applying to such an article a liquid composition containing, as an essential anti-static component, at least one water-dispersible derivative of a polyethyleneimine having an average molecular weight of at least 300, said derivative having at least one hydroxyalkyl group connected with at least one nitrogen atom.

5. The process of reducing the tendency of yarns, filaments, fibers, woven, knitted and felted fabrics and other articles composed of or containing a water-insoluble vinyl resin formed by the polymerization of at least one vinyl compound including a vinyl halide to accumulate charges of static electricity, which comprises applying to such an article a liquid composition containing, as an essential anti-static component, at least one water-dispersible derivative of a polyethyleneimine having an average molecular weight of at least 300, said derivative having directly connected with at least one nitrogen atom at least one aminoalkyl group containing not more than five carbon atoms.

6. The process of reducing the tendency of yarns, filaments, fibers, woven, knitted and felted fabrics and other articles composed of or containing a water-insoluble vinyl resin formed by the polymerization of at least one vinyl compound including a vinyl halide to accumulate charges of static electricity, which comprises applying to such an article a liquid composition containing as an essential anti-static component, at least one water-dispersible derivative of a polyethyleneimine having an average molecular weight of at least 300, said derivative having directly connected with at least one nitrogen atom an alkyl group containing not more than five carbon atoms.

7. The process of reducing the tendency of yarns, filaments, fibers, woven, knitted and felted fabrics and other articles composed of or containing a water-insoluble vinyl resin formed by the polymerization of at least one vinyl compound including a vinyl halide to accumulate charges of static electricity, which comprises applying to such an article a liquid composition containing, as an essential anti-static component, at least one water-dispersible derivative of a polyethyleneimine having an average molecular weight of at least 300, said derivative having directly connected with at least one nitrogen atom the residue of a higher fatty acid containing between ten and twenty carbon atoms.

8. The process of reducing the tendency of yarns, filaments, fibers, woven, knitted and felted fabrics and other articles composed of or containing a vinyl resin formed by the polymerization of at least one vinyl compound including a vinyl halide, to accumulate charges of static electricity, which comprises applying thereto a composition containing, as an essential anti-static component, a water-dispersible polyethyleneimine having an average molecular weight of at least 300.

9. The process of reducing the tendency of yarns, filaments, fibers, woven, knitted and felted fabrics and other articles composed of or containing a vinyl resin formed by the polymerization of at least one vinyl compound including a vinyl halide, to accumulate charges of static electricity, which comprises applying thereto a composition containing, as an essential anti-static component, a water-dispersible polyethyleneimine having an average molecular weight within the range between 300 and 3000.

10. The process of reducing the tendency of yarns, filaments, fibers, woven, knitted and felted fabrics and other articles composed of or containing a vinyl resin formed by the polymerization of at least one vinyl compound including a vinyl halide, to accumulate charges of static electricity, which comprises applying thereto a composition containing a wetting agent and, as an essential anti-static component, a water-dispersible polyethyleneimine having an average molecular weight of at least 300.

11. The process of reducing the tendency of yarns, filaments, fibers, woven, knitted and felted fabrics, and other articles composed of or containing a vinyl resin formed by the polymerization of at least one vinyl compound including a vinyl halide, to accumulate charges of static electricity, which comprises applying to such an article a composition containing, as an essential anti-static component, a reaction product of a higher fatty acid and a polyethyleneimine having an average molecular weight of at least 300.

12. Yarns, fibers, filaments, woven, knitted and felted fabrics and other articles resistant to the tendency to accumulate thereon charges of static electricity, which articles comprise a vinyl resin formed by the polymerization of at least one vinyl compound including a vinyl halide, said articles having been treated with a water-dispersible compound having a polyalkylene polyamine nucleus, said nucleus having an average molecular weight of at least 300.

WILLIAM N. STOOPS.
ALEXANDER L. WILSON.